(12) United States Patent
Harris, III

(10) Patent No.: US 7,971,653 B2
(45) Date of Patent: Jul. 5, 2011

(54) AERATOR WITH HOLE SPACING CONTROL SYSTEM

(75) Inventor: Troy W. Harris, III, Charlotte, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/482,113

(22) Filed: Jun. 10, 2009

(65) Prior Publication Data

US 2010/0314143 A1 Dec. 16, 2010

(51) Int. Cl.
*A01B 45/02* (2006.01)
(52) U.S. Cl. .............................................. 172/21; 172/3
(58) Field of Classification Search .................. 172/21, 172/22, 2, 3
See application file for complete search history.

(56) References Cited

U.S. PATENT DOCUMENTS

| | | | |
|---|---|---|---|
| 2,768,570 A * | 10/1956 | Strid ................................ 172/19 |
| 2,818,147 A * | 12/1957 | Mall et al. ...................... 477/175 |
| 2,918,130 A | 12/1959 | Thom |
| 3,789,939 A * | 2/1974 | Geislinger ...................... 180/6.5 |
| 4,511,004 A * | 4/1985 | Deneen ............................. 172/21 |
| 4,566,543 A * | 1/1986 | Kotani .............................. 172/4 |
| 4,602,687 A | 7/1986 | Hansen |
| 4,645,012 A | 2/1987 | Hansen et al. |
| 4,658,909 A | 4/1987 | McDermott et al. |
| 4,750,565 A | 6/1988 | Hansen et al. |
| 4,753,298 A | 6/1988 | Hansen et al. |
| 4,773,486 A | 9/1988 | Huber et al. |
| 4,819,734 A | 4/1989 | Classen |
| 4,867,244 A | 9/1989 | Cozine et al. |
| 4,884,637 A | 12/1989 | Rohleder |
| 5,029,652 A | 7/1991 | Whitfield |
| 5,207,278 A | 5/1993 | Hatlen |
| 5,586,603 A * | 12/1996 | Mattis .............................. 172/21 |
| 5,673,756 A | 10/1997 | Classen |
| 5,988,290 A | 11/1999 | Banks |
| 6,041,869 A | 3/2000 | Lewis et al. |
| 6,061,617 A * | 5/2000 | Berger et al. .................... 701/50 |
| 6,081,224 A | 6/2000 | Rosenbrock |
| 6,102,129 A | 8/2000 | Classen |
| 6,119,054 A * | 9/2000 | Miki et al. ..................... 700/275 |
| 6,138,069 A * | 10/2000 | Ellertson et al. ................ 701/50 |
| 6,542,789 B2 * | 4/2003 | Ufheil ............................ 700/275 |
| 6,553,302 B2 * | 4/2003 | Goodnight et al. ............. 701/54 |
| 6,561,282 B2 | 5/2003 | Smith |
| 6,758,283 B2 * | 7/2004 | Lauer et al. ..................... 172/22 |
| 6,892,821 B2 | 5/2005 | Wessel |

(Continued)

FOREIGN PATENT DOCUMENTS

CA 1330738 7/1994

*Primary Examiner* — Robert E Pezzuto
*Assistant Examiner* — Jamie L McGowan

(57) ABSTRACT

An aerator with a hole spacing control system is disclosed. The aerator has a traction drive with at least a pair of driven wheels and a single steered wheel. A vehicle control unit provides commands to the traction drive to move the aerator at a specified ground speed. An operator-adjustable hole spacing actuator may be moved to a plurality of hole spacing settings. The hole spacing actuator is electrically connected to the vehicle control unit. The vehicle control unit includes logic to vary the commands to the traction drive based on the hole spacing settings from the actuator. An engine speed sensor and/or coring head speed sensor also may be electrically connected to the vehicle control unit, and the vehicle control unit commands being also based on inputs from those speed sensors.

13 Claims, 2 Drawing Sheets

U.S. PATENT DOCUMENTS

| | | |
|---|---|---|
| 6,948,568 B2 | 9/2005 | Banks |
| 6,997,122 B1 * | 2/2006 | Guzman ........................ 111/133 |
| 7,096,969 B2 | 8/2006 | Petersen et al. |
| 7,099,722 B2 * | 8/2006 | Casey ............................. 700/85 |
| 7,100,702 B2 | 9/2006 | Classen |
| 7,198,114 B2 | 4/2007 | Simon et al. |
| 7,267,181 B2 | 9/2007 | Banks |
| 7,293,612 B1 | 11/2007 | Petersen et al. |
| 7,341,114 B2 | 3/2008 | Classen et al. |
| 7,472,759 B2 | 1/2009 | Petersen |
| 7,487,842 B2 | 2/2009 | Classen et al. |
| 7,630,793 B2 * | 12/2009 | Thomas et al. ................ 700/275 |
| 2002/0189825 A1 * | 12/2002 | Livingstone .................... 172/21 |
| 2008/0257571 A1 * | 10/2008 | Keane et al. .................... 172/21 |

* cited by examiner

AERATOR WITH HOLE SPACING CONTROL SYSTEM

FIELD OF THE INVENTION

This invention relates to aerators for aerating ground surfaces. More specifically, the invention relates to a walk-behind aerator with a hole spacing control system to accurately form holes in turf at regularly spaced intervals.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have tines that repeatedly penetrate the ground surface, forming a plurality of holes so that the ground surface is aerated, to improve growth of the grass or other material and enhance the condition of the surface for playing purposes.

Aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical, are hollow or solid, and produce holes by pulling up plugs or cylindrical cores of soil as the tines move by rotation of the flywheel.

Walk-behind aerators typically have fixed hole spacing control positions. The hole spacing settings can be and typically are set between 0 and 6 inches. For example, the aerator may have a mechanical lever that can be used to select a mechanical stop, that in turn selects a gear in the transmission of the vehicle. Additionally, the hole spacing depends on the speed of the vehicle and the linkages between the engine and the coring head drive system.

For example, an operator may select a desired hole spacing, set the engine to full throttle, and then engage the coring head. The operator may need to adjust the throttle position until the hole spacing corresponds as close as possible to the selected setting. The mechanical drive system will move the aerator vehicle at a designated speed while rotating the coring head at a translated RPM, and thereby produce a pattern that approximates the selected spacing. The hole spacing may change, however, if the engine slows or speeds up, is not running smoothly, or if one or more transmission belts for the coring head drive system stretch and/or wear over time.

An aerator with a hole spacing control system is needed that can produce holes at the desired spacing regardless of the engine speed or other fluctuations in vehicle performance.

SUMMARY OF THE INVENTION

A hole spacing control system is provided so that an aerator can produce holes at the desired spacing regardless of the engine speed or other fluctuations in vehicle performance. The hole spacing control system includes an operator-adjustable hole spacing actuator that provides electrical signals corresponding to a specified hole spacing, and an engine speed sensor and/or coring head speed sensor providing electrical signals corresponding to engine speed and/or coring head speed. An electronic vehicle control unit receives the electrical signals from the actuator and the engine speed and/or coring head speed sensor, determines a required ground speed of the aerator based on the electrical signals, and commands a plurality of traction drive wheels to rotate at the required ground speed.

DESCRIPTION OF THE PREFERRED EMBODIMENT

Figure 1:
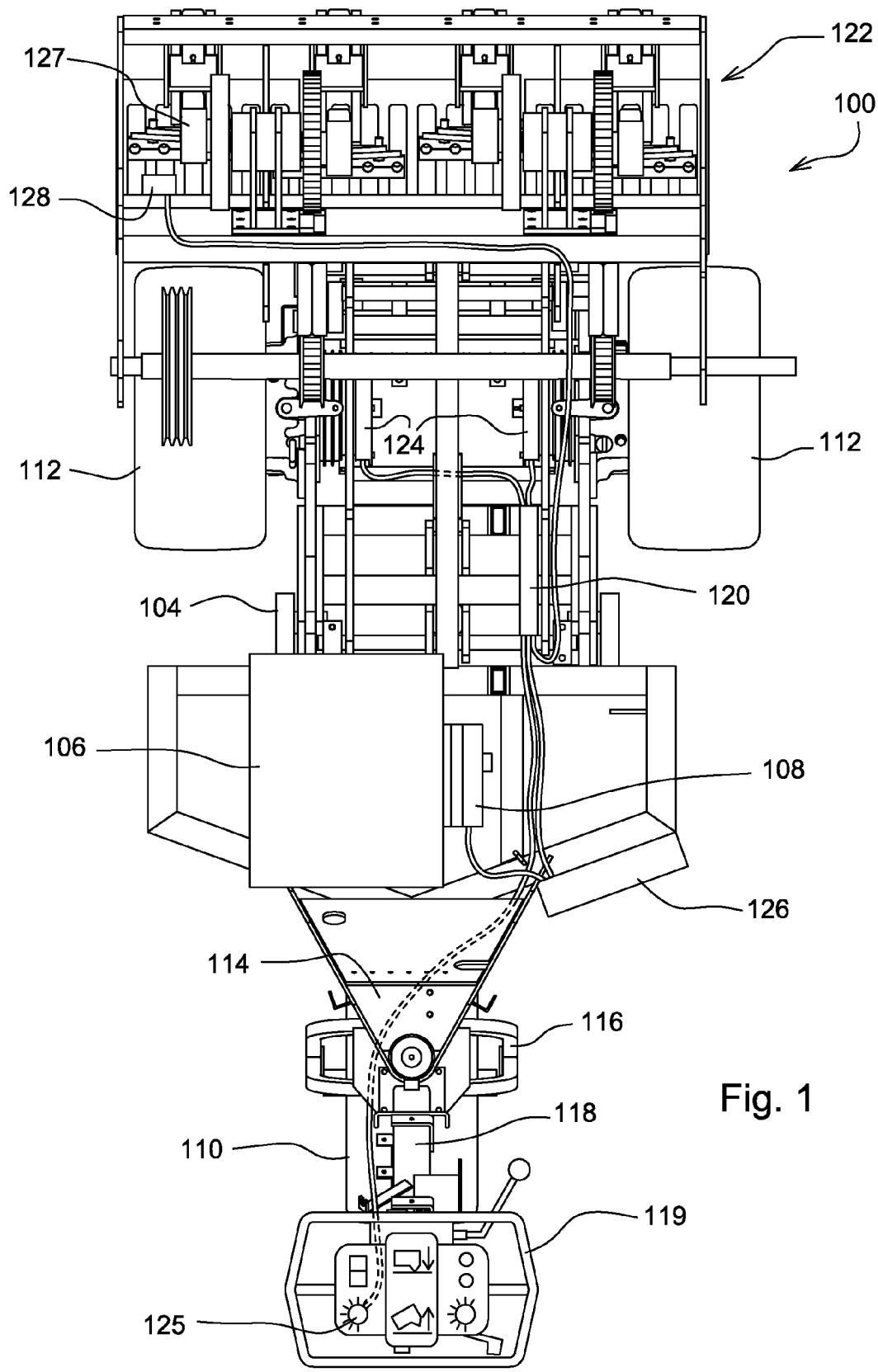
FIG. 1 is a top view of an aerator with a hole spacing control system according to a first embodiment of the invention.

FIG. 1 shows aerator 100 with a hole spacing control system according to a first embodiment of the invention. The aerator frame 104 may be supported for movement over the ground by a single steerable wheel 110, which may or may not be driven, and a pair of driven wheels 112. The frame 104 may have a neck 114 extending upwardly therefrom, and the single steerable wheel may be carried in a pivotal yoke 116 that can rotate about a vertical pivot axis attached to the neck. An upwardly and forwardly extending handle assembly 118 may be coupled to the pivotal yoke that carries the front wheel, and may include operator controls 119 that are connected to electronic vehicle control unit 120. Alternatively, operator controls may be positioned elsewhere on the aerator frame instead of the handle assembly. An operator may walk ahead of the aerator and steer the vehicle by using the handle assembly to pivot the single steerable front wheel about the vertical pivot axis.

In one embodiment, coring head 122 may be mounted on the rear of the aerator, either behind the rear drive wheels and tires, between the rear drive wheels and tires, or adjacent the rear axle(s). The coring head may carry a plurality of tine assemblies that reciprocate up and down by rotation of crankshaft 127. Each tine assembly may have a plurality of coring tines that are driven into the ground and produce holes for the purpose of aerating the turf. Each tine assembly may include a rubber dampener system that absorbs the forward motion of the aerator to help improve hole quality by minimizing hole elongation. The coring head may be raised and lowered using an hydraulic, electric or electro hydraulic lift and lower system. For example, an electric motor may power a hydraulic pump to engage a hydraulic cylinder that raises and lowers the coring head.

In one embodiment, the aerator may have an internal combustion engine 106 supported on the frame that may be used to operate coring head 122. The internal combustion engine also may provide traction drive for the rear wheels through a mechanical transmission, or through a hydrostatic transmission with a pump to supply pressurized fluid to a single hydraulic motor or pair of hydraulic motors for rotating the rear wheels.

Alternatively, as shown in FIG. 1, internal combustion engine 106 may drive an alternator or generator 108 to generate electric power for electric traction drive motors 124. For example, each electric traction drive motor 124 may independently rotate each wheel. Alternatively, the aerator may use electric storage batteries or other power supplies to generate power for the coring head and/or traction drive.

In one embodiment, the hole spacing control system may include an electronic hole spacing actuator 125 mounted along with other operator controls 119 on the handle. For example, the hole spacing actuator may be a rotatable potentiometer or similar device that provides a variable voltage input to electronic vehicle control unit 120. The vehicle control unit is an electronic controller that receives the voltage input from the hole spacing actuator, along with engine speed and/or coring head speed inputs, and executes a software routine to determine the appropriate ground speed for the specified distance between holes, and run the traction drive at that speed.

In one embodiment, the vehicle controller may receive engine speed input from generator controller 126 which may be connected to Hall effect sensors provided in generator 108. Alternative means for sensing engine speed, such as a tachometer on the engine magneto, may be used. Similarly, the vehicle controller may receive coring head speed input from sensor 128.

Figure 2:
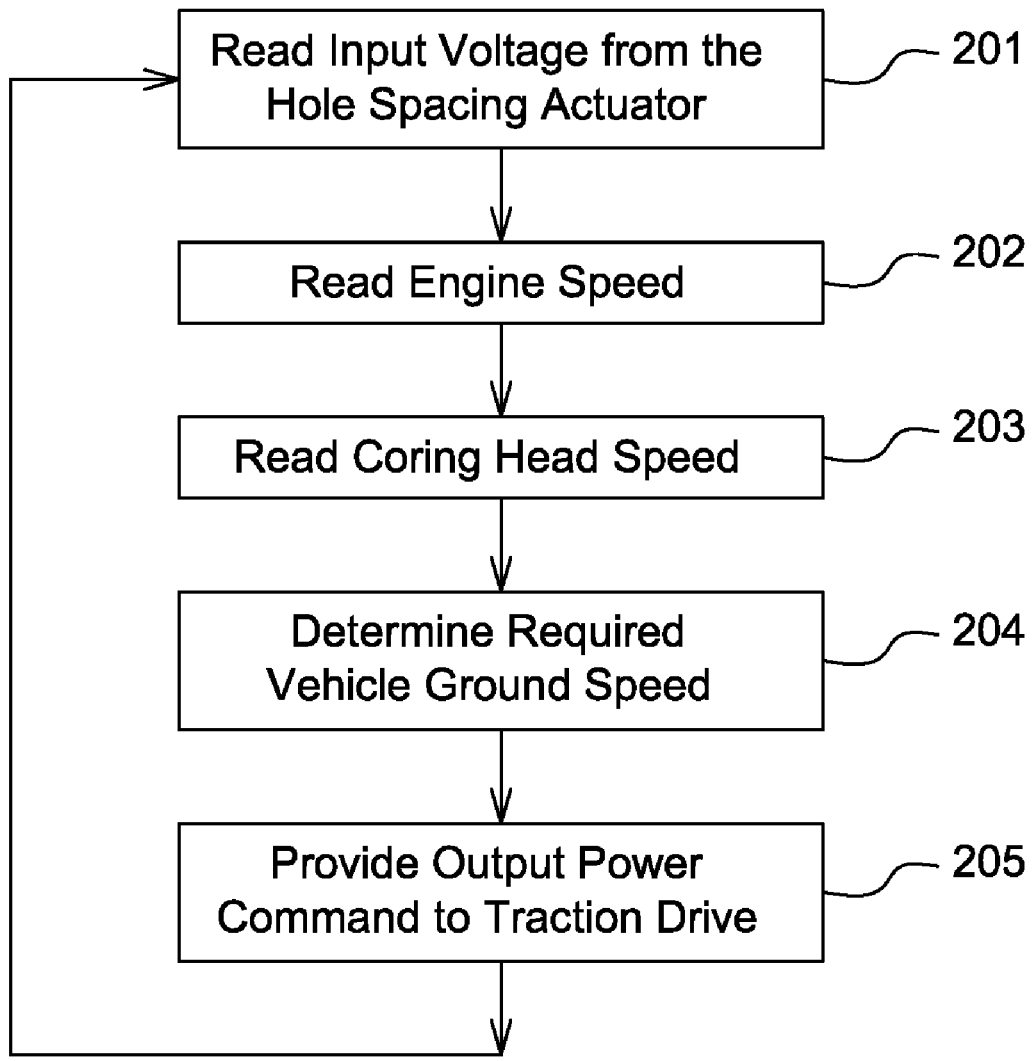
FIG. 2 is a flowchart of a hole spacing control system according to a first embodiment of the invention.

The flow diagram of FIG. 2 shows an embodiment of the hole spacing control system which may include software instructions that the vehicle control unit executes, preferably at regular intervals of about 20 milliseconds. In block 201, the vehicle control unit reads an input voltage from the electric hole spacing actuator.

In addition to receiving the desired hole spacing input from the electric hole spacing actuator, the vehicle control unit receives inputs from the engine speed and/or coring head speed sensors, and then adjusts the traction drive ground speed to match the rate at which the coring head tines produce holes in the turf. Specifically, in block 202, the vehicle control unit reads the engine speed. In block 203, the vehicle control unit reads the coring head rpm. The coring head rpm may be provided electronically by Hall effect sensors on the coring head crankshaft, for example. The vehicle control unit may read only one or both of the coring head speed and the engine speed.

In block 204, the vehicle control unit may determine the required vehicle ground speed for the specified hole spacing, engine rpm and/or coring head rpm. The required vehicle speed is the specified ground speed of the aerator, which the vehicle control unit may determine as follows:

$$V_s = (h_s \times H_{revs}) \times 0.000947$$

where:
$V_s$=required vehicle speed (miles per hour)
$H_s$=hole spacing (inches)
$H_{revs}$=coring head revolutions per minute In one embodiment, once the vehicle control unit determines the required vehicle ground speed, the vehicle control unit provides an output power command to the traction drive system in block 205. The output power command will operate a traction drive motor or motors at the speed necessary for the hole spacing specified by the electric actuator. For example, the vehicle control unit may provide a speed command to a variable displacement hydraulic motor that operates left and right drive wheels through a differential.

Alternatively, in one embodiment, the vehicle control unit may provide separate vehicle ground speed commands to independent left and right traction drive motors. For example, if the traction drive motors are electric motors, the vehicle control unit may provide commands to drive each motor at a different ground speed. If the traction drive motors are hydraulic motors, each motor may have a variable opening orifice so that each motor may be proportionally controlled by commands from the vehicle control unit. If the aerator is traveling in a straight line, as is frequently the case while the coring head is operating, the vehicle control unit may provide both traction drive motors with the same speed commands.

The hole spacing control system provides accurate hole spacing control on level surfaces, and also on varying terrain, or where conditions and equipment may affect the ground speed or coring head speed of the aerator. The system removes the common component tolerance and wear factors associated with mechanical components such as belts and engine performance issues, and also frees the operator to select a lower engine rpm if desired or conditions warrant. Selecting a lower engine rpm to run the aerator may save fuel, reduce emissions, and reduce noise during operation.

The invention claimed is:

1. A hole spacing control system for an aerator, comprising:
   a hole spacing actuator having variable operator selectable hole spacing settings that provides electrical signals corresponding to the selected hole spacing settings;
   an engine speed sensor providing electrical signals corresponding to engine speed;
   an electronic vehicle control unit receiving the electrical signals from the actuator and the engine speed sensor, determining a required ground speed of the aerator based on the electrical signals for the selected hole spacing setting and engine speed, and commanding a plurality of traction drive wheels to rotate at the required ground speed; and
   a coring head connected to a crankshaft rotating at the engine speed to reciprocally move a plurality of coring tines up and down to produce holes at the selected hole spacing settings.

2. The hole spacing control system of claim 1 wherein the hole spacing actuator is a potentiometer.

3. The hole spacing control system of claim 1 wherein each of the traction drive wheels is independently driven by an electric motor.

4. The hole spacing control system of claim 1 wherein each of the traction drive wheels is independently driven by a hydraulic motor.

5. The hole spacing control system of claim 1 wherein both of the traction drive wheels are driven by a hydraulic motor and a mechanical differential.

6. A hole spacing control system for an aerator, comprising:
   a vehicle control unit determining a required ground speed of the aerator for a hole spacing input from an operator-actuated potentiometer having a plurality of operator selectable hole spacing settings and an engine speed input from an engine speed sensor;
   a pair of independent wheel motors receiving speed commands from the vehicle control unit to rotate at the required ground speed corresponding to the hole spacing setting and engine speed input; and
   a coring head carrying a plurality of coring tines that reciprocate up and down to form holes at the selected hole spacing settings by rotation of a crankshaft at the engine speed.

7. The hole spacing control system of claim 6 wherein the wheel motors are electric motors.

8. The hole spacing control system of claim 6 wherein the motors are hydraulic motors.

9. The hole spacing control system of claim 6 wherein the required ground speed determined by the vehicle control unit also is based on a coring head speed input from a coring head speed sensor.

10. A hole spacing control system for an aerator, comprising:
    a traction drive including at least a pair of driven wheels and a single steered wheel;
    a vehicle control unit providing commands to the traction drive to move the aerator at a specified ground speed;

an operator-adjustable hole spacing actuator that may be moved to a plurality of operator-selected hole spacing settings; the hole spacing actuator being electrically connected to the vehicle control unit; the vehicle control unit including logic to automatically command the traction drive speed based on the hole spacing setting from the actuator; and a coring head carrying a plurality of coring tines that reciprocate up and down to form holes at the selected hole spacing settings by rotation of an engine crankshaft.

11. The hole spacing control system of claim 10, further comprising an engine speed sensor electrically connected to the vehicle control unit; the vehicle control unit commands to the traction drive being also based on engine speed inputs from the engine speed sensor.

12. The hole spacing control system of claim 10, further comprising a coring head speed sensor electrically connected to the vehicle control unit; the vehicle control unit commands to the traction drive being also based on coring head speed inputs from the coring head speed sensor.

13. The hole spacing control system of claim 10, wherein the traction drive includes independently driven wheel motors for each driven wheel.

* * * * *